DAVID ARONSON
INVENTOR.

Nov. 24, 1964 D. ARONSON 3,158,008
ABSORPTION REFRIGERATION APPARATUS
Filed Oct. 10, 1962 2 Sheets-Sheet 2

DAVID ARONSON
INVENTOR.

United States Patent Office 3,158,008
Patented Nov. 24, 1964

3,158,008
ABSORPTION REFRIGERATION APPARATUS
David Aronson, Upper Montclair, N.J., assignor to Worthington Corporation, Harrison, N.J., a corporation of Delaware
Filed Oct. 10, 1962, Ser. No. 229,632
6 Claims. (Cl. 62—476)

This invention relates to a refrigeration apparatus having improved design and structural features. It relates in particular to a vacuum absorption machine employing as the circulating absorbent a brine solution consisting of a hydrophilic salt in water which absorbs refrigerant water.

A salt brine as the absorbent in such an apparatus is found to be quite effective but often entails operating difficulty in that crystallization of the salt is likely to occur. Crystallization of absorbent solution in the system may occur under varied circumstances. When it does take place crystals tend to accumulate especially in particular parts of the machine and thus interrupt free circulation of refrigerant. Unless otherwise prevented, crystallization generally occurs ofter shutdown of the machine, that is, when the temperature of the entire system is lowered so that salt in the brine solution passes below its crystallization point. Crystallization also results from mechanical imperfections in the apparatus. For example, air leakage into the normally closed vacuum system causes a loss of the vacuum and consequently an overload on the system; indirectly this results in formation of solid salt particles.

Normally, the basic units of an absorption system consist of an absorber, a generator, a condenser, an evaporator, and a heat exchanger. These elements are connected by suitable piping, pumping and associated control means to define a closed refrigerent cycle. The respective elements as shown extensively by the prior art may be interconnected into a single unit or alternatively they may be interconnected and physically disposed as separate individual units. As a matter of practicality, and to provide a commercial package, the units are preferably arranged in such manner as to occupy as little volume as possible for the amount of refrigeration produced.

The present invention affords a new and novel arrangement of elements in an absorption machine circulating a saline solution in such manner as to permit more economical and efficient use of the available space and to reduce the hazards of crystallization. This result is achieved in part through the arrangement of the absorber and generator which are disposed to permit refrigerant in the system to gravitate toward the generator regardless of the cooling load imposed on the system. The heat exchanger, normally conducting brine of different concentrations, is disposed adjacent to or in contact with the generator for the purpose of conducting heat from the latter into weak solution flowing from the heat exchanger into the generator, and for heating of the entire solution charge to a flowable state following shutdown.

It is therefore an object of the invention to provide an absorption apparatus including essentially an absorber, a generator, a condenser, an evaporator and a heat exchanger connected in a novel arrangement for circulating saline solution.

A further objective is to provide an absorption machine of the type described which employs a saline solution with water as the refrigerant component, said unit having a generator and a heat exchanger arranged to facilitate startup and shutdown of the machine while minimizing crystallizing problems normally associated with the use of a saline type absorbent.

It is a still further object of the invention to provide an absortion unit of the type described which includes means providing gravitational flow of solution to the generator and heat exchanger to overcome crystallization of solution during the startup period, particularly in the heat exchanger.

Other objects of the invention not specifically mentioned will become clear to those skilled in the art from the following desciption made in conjunction with the drawings, in which.

Figure 1:
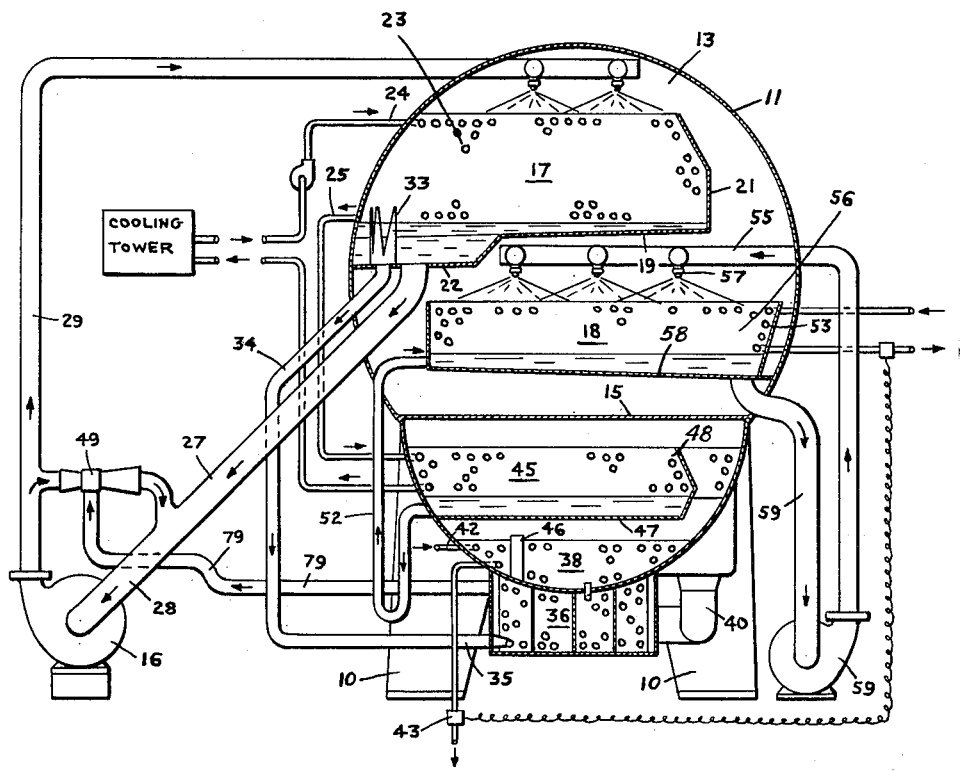
FIGURE 1 is a diagrammatic view of an absorption unit of the type described embodying the novel generator-heat exchanger arrangement.

The invention in brief contemplates a novel absorption refrigeration apparatus comprising essentially an absorber, an evaporator, a condenser, and a heated generator and a heat exchanger carried within an enclosing shell or shells, and having pump means arranged to circulate brine refrigerant. Control means associated with the pump is interconnected with the aforementioned elements to adjust the flow of brine solution in accordance with the load imposed on the system. The control means is cooperative with the generator through a suitable heating arrangement to alter input of thermal energy to the generator and thus conform the rate of brine boiling to meet immediate needs of the system.

To overcome startup delays due to the tendency of brine to freeze or crystallize in the system because of inadvertent leakage or periodic shutdown, means is provided for efficiently utilizing the generator heat input. Notably, the heat exchanger means arranged to circulate both weak and concentrated brine solution, is disposed in heat exchange contact with the generator whereby heat from the latter may be readily conducted to the solution. Further, the heat exchanger is disposed preferably in the lower part of the absorption system such that on shutdown of circulatory pumps, brine will flow to and accumulate in the lower part of the apparatus including the generator and the heat exchanger.

To illustrate the instant invention, an exemplary absorption system will be hereinafter described employing the novel arrangement of generator and heat exchanger. The general disposition of basic components constituting the system is disclosed in my presently co-pending application entitled Refrigeration Apparatus filed on October 1, 1962 by D. Aronson as Serial No. 227,369.

In the above noted system, absorber and evaporator are disposed within a first horizontally disposed low pressure shell enclosure whereby water vapor may pass to the absorber and be contacted by sprayed streams of concentrated brine solution. Condenser and generator elements are positioned in a higher pressure second horizontal shell enclosure and relatively disposed with respect to each other to pass vaporized refrigerant to the condenser.

In the generator, refrigerant or water vapor is boiled from weak solution for the purpose of concentrating the same. Vapor thus driven from the solution is condensed in the indirectly cooled condenser.

Liquid condensate from the condenser is directed to the lower pressure side of the system to cool chiller coils by evaporation. The quantity of refrigerant circulated over heat transfer elements or tubes in the chiller, and the quantity of brine circulated over tubes in the absorber, is normally in excess of that required for evaporation or absorption in the respective units. Concentration of brine in the absorber section may be maintained by introduction of strong solution to the absorber through supplementary pumping means or by an ejector cooperative with pumping means to draw concentrated solution into the weak solution circulatory system.

Means is also provided for feeding a stream of weak solution preferably by gravity from the absorber to the generator for the purpose of solution concentration. This flow rate to the generator is automatically variable and will normally adjust in conformance with the load imposed on the machine. In order to preheat a first stream of weak solution passing from the absorber to the generator and to simultaneously chill a second concentrated stream of solution leaving the generator for reintroduction into the absorber spray system, the respective streams are brought into indirect heat exchange contact in the heat exchanger disposed intermediate the respective units.

By way of clarification, in the following description reference is made to the preferred absorbent as being a lithium bromide water solution. It is understood, however, that other similar hydrophilic saline solutions may be employed with water being used as the refrigerant.

In the various components of the cycle, solution will undergo changes and will be found in varying degrees of concentration. For example, the term weak solution as hereinafter used defines a condition when the solution contains a large amount of refrigerant and is thus characterized by very weak absorbing properties. The term strong solution on the other hand implies a condition in which there is a relatively low refrigerant content and consequently high absorption capability.

Under normal operating conditions, weak solution will enter the generator from the heat exchanger with a concentration of from 55 to 61% and leave the generator after boiling at about 66% concentration. It should be understood with reference to the instant system that any salt in the refrigerant is present only as contaminant and diminishes the performance of the cycle. Systems may however be designed to use a very weak brine to avoid freezing but for normal air conditioning such is not the case. Continuing the normal operating conditions, the condenser and evaporator will hold only pure refrigerant.

The absorber section includes both a concentrated spray solution and also a pool of solution varying from 55 to 63% concentration. It is further understood that as a matter of practicality the solution may contain a small amount of a compatible inhibitor to avoid undue corrosion of metallic parts in contact with the salt solution.

As previously mentioned, crystallization ordinarily commences when the machine operation ceases. This occurrence results as solution temperature falls below the normal crystallization temperature for a particular salt concentration. The prior art has long recognized the problem and has suggested as one method of avoiding crystallization, dilution of the entire system after pumping action stops.

Rather than attempting to completely avoid crystallization in the apparatus, the present invention is premised on the belief that satisfactory results may be obtained by permitting crystallization of solution and by providing means for thereafter rapidly dissolving crystallized salt upon startup of the unit. This is accomplished first, by causing solution to drain or gravitate to the generator and the heat exchanger normally located at the underside of the machine. Secondly, heat normally fed to the generator solely for solution boiling purposes is further utilized by conductive transfer to the solution in the heat exchanger whereby the entire charge of the apparatus may be subjected to simultaneous heating and subsequent fluidization thus prompting a smoother more uniform startup.

Referring to the drawings, FIGURE 1 illustrates diagrammatically an absorption unit of the type presently contemplated which includes an elongated hermetic shell 11 supported by a plurality of legs 10 fixed to the underside.

The shell may be a unitary, elongated body horizontally disposed and preferably of welded construction having end plates including removable access openings defining an air tight inner closure. Alternatively, the shell may consist of a plurality of elongated, adjacently disposed bodies so constructed and arranged as to cooperatively define a compact unit.

It should be remembered that while the invention is described as embodied within a particular absorption unit it is understood that the novel generator-heat exchanger arrangement may be employed and operated with other units. The primary requirement is that the arrangement be so disposed with relation to the other system elements as to receive a flow of solution either by gravity or by pumping means and to accumulate the same during the shutdown period.

Referring to FIGURE 1, a shell 11 is divided into an upper chamber 13 and a lower chamber 14 separated by a pressure tight partition 15 welded along opposite edges of the shell inner wall. Externally supported adjacent to or on the shell are pump means 16 and 54 which through a suitable piping arrangement are in communication with elements contained within the shell.

Absorber 17 and evaporator 18 are shown positioned in the upper or lower pressure chamber 13 of shell 11. The absorber is made up essentially of a liquid holding tray-like receptacle 19 having a horizontally extending portion and having an upturned edge 21. The tray includes a solution holding sump 22 and is welded along one side to the shell wall. The upturned edge 21 is spaced inwardly of the shell inner wall forming a spray guard or vapor guide for conducting vaporized refrigerant upwardly into the absorber 17. A tube bundle 23 positioned above tray 19 is provided with inlet 24 and outlet 25 connected for circulating water or other cooling fluid. Condensing water after leaving tube bundle 23 is circulated through the condenser 45 and subsequently through a cooling tower or other suitable heat exchange means external to the unit itself although not presently shown as such in the figures.

Conduit 27 directs weak solution by gravity feed from sump 22 to inlet 28 of the absorber pump 16 which circulates weak solution by way of loop 29 to manifold 31. Streams of brine solution are sprayed onto the surface of the tube bundle 23 thus effecting a continuous condensation to maintain the absorber at an atmosphere of about 0.3 inch of mercury. This complete circulating of brine from the absorber tray to the spray manifold is a continuous operation, the weak brine solution from the absorber being supplemented by addition of strong solution drawn from the generator as will be hereinafter explained.

Also associated with tray 19 and sump 22 is a liquid overflow arrangement 33 embodying a weir device and positioned to receive an overflow of weak solution from tray 19. This overflow device is arranged as an internal part of the absorber control system to pass an amount of solution in accordance with the imposed cooling load. The overflow is communicated through a conduit 34 directly to the inlet 35 of heat exchanger 36 positioned at the lower part of the machine. When the heat exchanger is of the shell and tube type, weak solution flow from the absorber is preferably directed to the tube side. Hot concentrated solution fed from the generator is directed through the shell side of the heat exchanger 36 to preheat weak solution passing through the tubes prior to entry of the latter into the generator.

As a feature of the present control system, absorber 17 is positioned sufficiently high in lower pressure chamber 13 to permit gravity flow of solution down into the high pressure generator 38. This difference in height compencates for the normally experienced differential in operating pressures between absorber 17 and generator 38. It also overcomes frictional resistance of piping through said parts and through the heat exchanger itself.

To overcome an expected generator head pressure of about 3.0 inches of mercury as compared with the reduced absorber pressure, a certain height differential between said elements is essential. It is found that between the level of strong solution in the generator and the level of weak solution in the absorber at least about 2.5 feet should be maintained to sustain proper circulation.

Referring to FIGURE 1, generator 38, maintained at a pressure of about 3.0 inches of mercury, is located in the lower part of the higher pressure chamber 14 which defines a reservoir or pool for holding substantially the entire volume of brine solution in the system. The generator 38 is communicated through line 40 to the heat exchanger outlet for receiving a flow of weak solution to be regenerated. A heating coil or tube bundle 42 cooperative with shell 11 in the generator is connected to a boiler for circulating steam or other heat source auxiliary to the absorption machine.

Although we refer to the instant source of thermal energy for the machine as a steam boiler or generator, it is understood that other normally employed means may serve as well for supplying heat as needed. For example, the generator may be fired by direct flame heating or by other commercially available heating arrangements.

When steam is the heating medium however, as in the instant case, a suitable control means such as a remotely and automatically operable valve 43 may be actuated by sensing or monitoring means at the point in the absorption circuit where the chilled water leaves the evaporator coil or tube bundle. The generator heating coil 42 consists of fluid carrying tubes supported in the generator liquid holding portion and carrying steam at a temperature of about 240° F. into the generator 38 for the purpose of heating or boiling weak solution. This boiling causes vaporous refrigerant, that is water vapor, to rise and pass into heat exchange contact with condenser 45.

As water vapor is driven from weak solution the residue in the generator becomes more concentrated and is conducted through means such as an overflow 46 and line 40 to the shell portion of the heat exchanger 36 and thence to ejector 49 and pump 16. Ejector 49 is cooperative with absorber circulating pump 16 as to inject strong or concentrated solution into normally weak solution being circulated from the absorber tray 19 into the absorber spray system by way of pump 16.

By positioning generator 38 at the lowest portion of shell 11, or if in a different shell, substantially below the absorber solution level, an advantage is gained over what has been taught by the prior art for avoiding troublesome crystallization problems. Most notably, since solution will flow by gravity downward to accumulate in the generator 38 and heat exchanger 36, respectively, solution in the various pipes connecting the respective absorption components also gravitates toward the bottom of the machine.

Condenser 45 is positioned in the higher pressure chamber 14 of shell 11 above generator 38. The condenser includes a receptacle 47 supported longitudinally in the shell for holding condensate. The condenser may be of the single of multi-pass type as required. Tube bundle 48 supported above receptacle 47 is provided with inlet and outlet means communicated with the source of condenser cooling water which as previously noted may flow directly through the absorber tube bundle 23 as is usually the most economical procedure, or be passed to a cooling tower or other heat exchange means external to the unit.

Evaporator 18 is positioned in the lower pressure upper portion of shell 11 immediately below absorber 17. Conduit 52 is communicated with condenser tray 58 to receive condensate and pass the same under condenser pressure upwardly for flashing into the evaporator. External loop 52 may be positioned outside the shell to function as a trap and also to prevent, or at least limit, entrance of steam from the condenser into the low pressure evaporator. Under normal loading conditions, condensate will enter the lower pressure evaporator and in flashing yield up to about 9% steam.

Evaporator or chiller 18, includes a horizontally extending tray 58 having an upturned lateral edge 53 extending longitudinally of the shell to hold a pool of liquid refrigerant. Conduit means 59 communicates the refrigerant pool through a pump 54 for circulating liquid to spray manifold 55 positioned above evaporator tube bundle 56. Manifold nozzles 57 in the spray manifold 55 direct refrigerant onto the chilled water carrying tube bundle 56 to achieve optimum tube surface wetting and effect a maximum evaporation of refrigerant by extracting heat from the chilled or circulated water.

Figure 3:
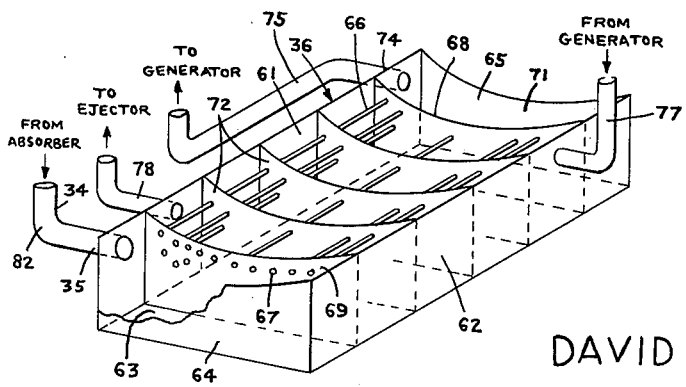
FIGURE 3 is an isometric view on an enlarged scale of a heat exchanger of the type illustrated in FIGURE 1.

Heat exchanger 36 as shown in FIGURES 1 and 3 of the drawings is positioned in the lower part of shell 11 in contact with the generator 38 outer surface. As shown, the heat exchanger may in some instances be an integral part of the generator shell or it may alternatively be external to the generator. Further, construction of the heat exchanger may be any of the several types normally used for such an application, namely, the tube and shell type, or merely a plurality of adjacently positioned fluid carrying passages. The primary function of this element during the absorption process is to economize on heat within the absorption system by heat exchanging between concentrated and weak flows of solution and to liquefy crystallized solution on startup.

In effectuating the latter purpose, the heat exchanger is so constructed and disposed as to bring weak solution from the absorber into indirect contact with the heated generator shell. Thus, heat conducted through the generator shell into cooler strong solution will be dissipated throughout the heat exchanger. In effect, the entire charge of the machine including that which is held in both generator and heat exchanger will be brought into a flowable condition with a minimum lapse of time after startup.

While it is not intended to limit the physical shape and disposition of the heat exchanger, the enlarged embodiment shown in FIGURE 3 is representative of the heat exchanger of the type shown in FIGURE 1 for carrying out the objectives of the invention. As shown, heat exchanger 36 includes a pair of oppositely placed upstanding sides 61 and 62 having a bottom plate 63 and end panels 64 and 65 seam welded to define a generally elongated open top, liquid holding closure. It is understood of course that the unit does not provide an enclosure until raised into position and fastened adjacent the lower wall of the generator outer shell as shown in FIGURE 1. Normally, the generator and heat exchanger are joined in a circumferential seam weld about the upper edge of the respective sides and end panels to insure a fluid tight joint therebetween.

Referring to FIGURE 3, to form a satisfactory weld the upper surface of heat exchanger end panels 64 and 65 together with internal cross-members or baffles are contoured along the upper surface in an arcuate configuration conforming with the shape of the generator outer surface.

Following standard heat exchanger construction, there is provided essentially a tube bundle 66 defining a first passage supportably carried within the enclosure forming a second passage by a pair of fluid sealed plates 67 and 68 spaced longitudinally from end panels 64 and 65 respectively to define opposed inlet header 69 and outlet header 71. Plates 67 and 68 are provided with a plurality of openings for receiving and positioning tube ends registered therewith. A plurality of baffle plates generally designated 72 longitudinally spaced within the enclosure, are also constructed and arranged to support tubes extending therethrough. The baffles are positioned to provide an irregular second passage for hot concentrated fluid being passed longitudinally through the heat exchanger for transversely contacting liquid carrying tubes.

Fluid inlet 35 communicates with the inlet header 69 to receive weak solution through conduit 34 from absorber 17. Header 71 includes an outlet 74 having an elongated conduit 75 attached thereto for carrying solution and introducing the same, preferably at one end of generator 38. Thus, solution directed into inlet header 69 will pass through tube bundle 66 and be deposited in the outlet header 71 after passing in counter flow heat exchange contact with hot concentrated solution in the heat exchanger shell portion.

Heat exchanger 36 outer shell is provided with an inlet 77 communicated with the absorber overflow means 46 in the generator 38 for receiving a flow of hot concentrated solution at a rate proportional to the measured heat input to the unit which is in turn proportional to the degree of cooling required. Thus, the flow of hot concentrated solution will be a measure of the cooling output of the absorption unit. Hot solution at the shell outlet end of the heat exchanger will be directed through shell outlet 78 and carried by conduit 79 to the ejector 49 inlet for recirculation through absorber pump 16 into absorber spray manifold 31.

Figure 2:
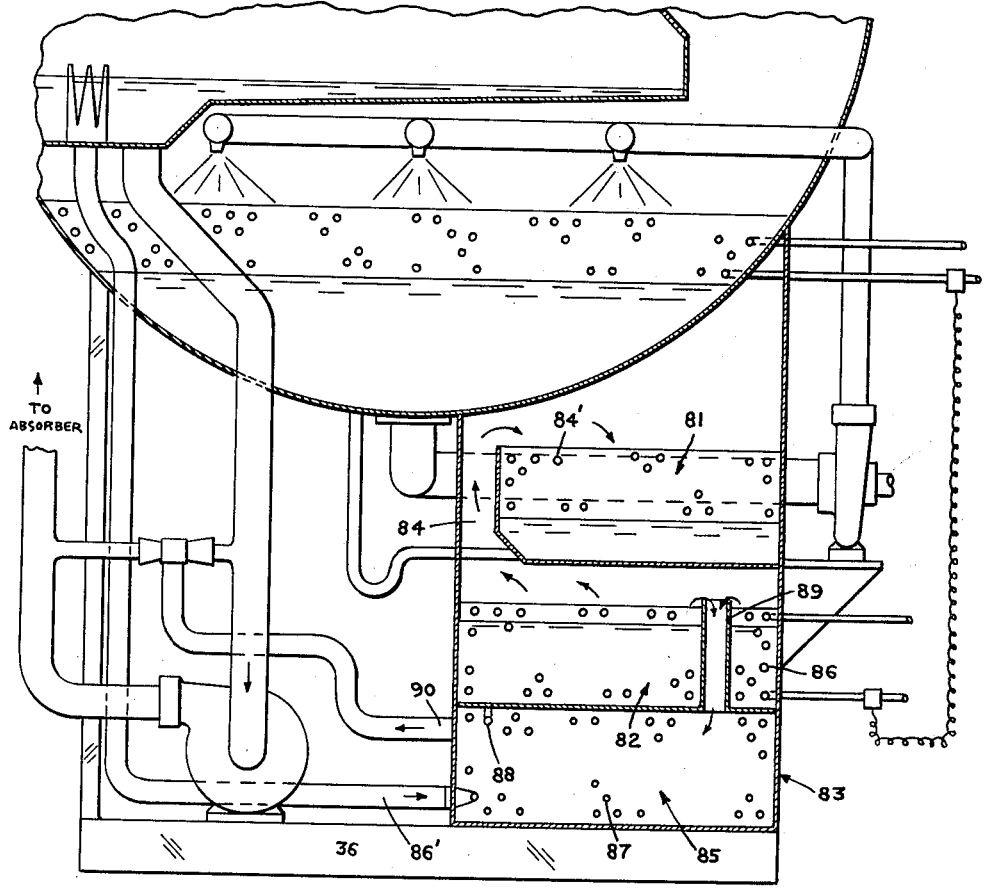
FIGURE 2 is a segmentary view in partial cross-section and on an enlarged scale of an alternate embodiment of absorption unit employing a generator-heat exchanger combination in accordance with the invention.

FIGURE 2 illustrates an embodiment of the invention in which the generator and condenser elements are positioned beneath a circular shell containing the absorber and evaporator respectively. As shown, generator 82 and condenser 81 are disposed within a substantially rectangular casing 83 extending longitudinally of the circular shell, with the generator positioned beneath the condenser for passing vapors upward through passage 84 into communication with tube bundle 84'.

Generator 82 comprises a tube bundle 86 carrying heating fluid and supported within an essentially flat bottom chamber holding hot solution. Heat exchanger 85 is positioned at the underside of generator 82 and extends in a direction parallel thereto. Heat exchanger 85 comprises essentially a structure defining an elongated chamber holding a liquid carrying tube bundle 87 or other fluid carrying unit suitable to the purpose. Thus, weak solution from the absorber will enter inlet 86', be fed through tube bundle 87 and introduced to the generator at passage 88. Thereafter, concentrated solution will flow into overflow means 89, through the heat exchanger shell and thence by way of outlet 90 to the ejector or pumping means for circulation of the concentrated solution back into the absorber spray system.

While not presently shown, it is understood that the described heat exchanger means may assume other suitable forms for the purposes of perfecting a more efficient heat exchange particularly at startup when crystallization of solution is most prevalent. For example, although we have shown as in FIGURE 2, a heat exchanger 85 positioned adjacent the bottom plate of generator 82, somewhat the same effect may be achieved by positioning the heat exchanger to one side of the generator.

As previously mentioned, while the invention has been described in conjunction with a particular arrangement of elements constituting an absorption unit, it is not intended to limit the present generator-heat exchanger relationship to the so described embodiment. The advantages derivable through use of the present apparatus will be reflected in added efficiency and less cost per ton of refrigeration produced. This is true even though some essential absorber parts be repositioned, so long as the generator and heat exchanger are connected to receive and accumulate the bulk of saline solution when the machine is shut down in order that heat may be concentrated most efficiently to effect a quick startup. Although the prescribed arrangement of parts will have a minimum beneficial effect under constant load conditions, where the unit is closed down periodically or daily, thus necessitating a daily startup, the advantages will be greatly appreciated and much more noticeable.

It is further understood that certain changes and modifications may be made in the disclosed apparatus by those skilled in the art without departing from the spirit and scope of the invention.

What is claimed is:

1. In an absorption refrigeration apparatus circulating a saline solution comprising a vaporizable refrigerant and an absorbent, and having an absorber, a generator, and conduit means communicating said absorber and generator for carrying streams of weak and strong solution therebetween, said generator defining a reservoir holding hot solution for vaporizing refrigerant therefrom, and having heating means cooperative with said reservoir to heat solution held therein:
   (a) heat exchange means interposed in said conduit means and having first and second passages disposed in heat exchange relationship with each other,
   (b) said first passage being connected to the conduit means carrying one of said streams of solution from the absorber to the generator,
   (c) said second passage being connected in the conduit means and carrying hot solution from the generator to the absorber,
   (d) said heat exchange means being positioned adjacent to and in direct heat exchange contact the generator defining said reservoir holding hot solution, to heat at least one of said first and second passages,
   (e) whereby solution in the heat exchanger will be maintained at a temperature above crystallization temperature thereof during operation of said apparatus.

2. In the refrigeration apparatus as defined in claim 1 wherein; said heat exchange means includes at least one wall thereof positioned contiguous with said reservoir in the generator holding hot solution, to conductively transmit heat from the said generator to at least one of said first and second passages.

3. In an absorption refrigeration system circulating a saline solution consisting of a vaporizable refrigerant and an absorbent material, said system including an absorber having means for introducing strong solution thereto, and a sump holding weak solution, a generator-heat exchanger connected to the absorber for reconcentrating said weak solution, said generator-heat exchanger including a shell:
   (a) a casing depending from said shell at the lower side thereof,
   (b) a partition in the casing forming first and second compartments,
   (c) means in said first compartment forming a reservoir for strong solution,
   (d) a heater element positioned in said first compartment for boiling refrigerant from solution held therein,
   (e) a tube bundle disposed in said second compartment connected to the absorber sump and to said first compartment for introducing weak solution to the latter,
   (f) passage means communicating said first compartment with the second compartment and carrying strong solution into heat exchange contact with said tube bundle, and
   (g) means communicating the second compartment with said absorber and carrying strong solution thereto.

4. In combination with an absorption refrigeration apparatus having means for circulating saline solution comprising a vaporizable refrigerant and an absorbent, said system including an absorber, a generator having an elongated wall defining a reservoir holding a supply of saline solution, and conduit means communicating said generator and said absorber to pass streams of saline solution from said generator to said absorber, and heating means cooperative with the generator defining said reservoir for boiling vaporizable refrigerant from solution contained therein:
   (a) heat exchange means including a casing forming a first elongated passage having inlet and outlet means, (b) a tube bundle positioned in said first elongated passage and forming a second passage having inlet and outlet means, (c) said second passage having at least one inlet means communicated to said absorber to receive a stream of weak solution therefrom and having the outlet means thereof connected to carry said stream of solution to the generator reservoir for removing said vaporizable refrigeration therefrom, (d) said second passage being in communication with said generator reservoir and receiving hot solution therefrom to conduct said solution to said means for circulating solution through the system, (e) said heat exchanger casing including at least one thermally conductive wall disposed contiguous with the generator reservoir wall, thereby positioning said first passage in heat exchange relationship with said generator reservoir wall, (f) whereby heat normally supplied to said solution held in said reservoir by said heating means for vaporizing refrigerant, will be conducted into solution contained in said first heat exchange passage.

5. In the combination defined in claim 4 including:
(a) a shell forming an elongated enclosure about said generator,
(b) said casing being dependent from said shell and forming a closure at the lower side thereof.

6. In the combination defined in claim 4 including:
(a) a shell forming a closure about said generator,
(b) said wall in said generator defining a reservoir being disposed horizontally of said shell positioning said reservoir in the upper portion of said shell and disposing said heat exchange means in the lower portion thereof.

References Cited by the Examiner
UNITED STATES PATENTS

| | | | |
|---|---|---|---|
| 2,099,201 | 11/37 | Getaz | 62—141 |
| 2,196,911 | 4/40 | Getaz | 165—2 |
| 2,365,797 | 12/44 | Bichowsky | 62—333 |
| 2,411,097 | 11/46 | Kopp | 165—158 |
| 2,498,945 | 2/50 | Edel | 62—101 |
| 2,582,837 | 1/52 | Leonard | 62—489 X |
| 2,599,428 | 6/52 | Berestneff | 62—489 X |
| 2,693,942 | 11/54 | Guala | 165—159 X |
| 2,821,369 | 1/58 | Hilliard | 165—159 |
| 2,877,000 | 3/59 | Person | 165—159 |
| 3,019,613 | 2/62 | Leonard | 62—497 X |

References Cited by the Applicant
UNITED STATES PATENTS

| | | |
|---|---|---|
| 2,099,201 | 11/37 | Getaz. |
| 2,196,911 | 4/40 | Getaz. |
| 2,365,797 | 12/44 | Bichowsky. |
| 2,498,945 | 2/50 | Edel. |

ROBERT A. O'LEARY, *Primary Examiner.*